US009123918B2

(12) United States Patent
Tsutsumi et al.

(10) Patent No.: US 9,123,918 B2
(45) Date of Patent: Sep. 1, 2015

(54) ELECTRIC STORAGE DEVICE

(75) Inventors: Masakazu Tsutsumi, Kyoto (JP); Jun Nakamura, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 834 days.

(21) Appl. No.: 13/336,961

(22) Filed: Dec. 23, 2011

(65) Prior Publication Data

US 2012/0160559 A1   Jun. 28, 2012

(30) Foreign Application Priority Data

Dec. 28, 2010 (JP) ................................. 2010-293134

(51) Int. Cl.
  *H01M 2/02* (2006.01)
(52) U.S. Cl.
  CPC ............ *H01M 2/021* (2013.01); *H01M 2/0277* (2013.01); *H01M 2/0275* (2013.01)
(58) Field of Classification Search
  None
  See application file for complete search history.

(56) References Cited

U.S. PATENT DOCUMENTS

| 5,543,244 A | 8/1996 | Klink et al. |
| 2004/0048149 A1 | 3/2004 | Gross et al. |
| 2007/0196733 A1 | 8/2007 | Lee |
| 2010/0203373 A1 | 8/2010 | Kawase et al. |
| 2010/0209750 A1 | 8/2010 | Nagamatsu et al. |
| 2011/0059344 A1 | 3/2011 | Kawase et al. |

FOREIGN PATENT DOCUMENTS

| JP | 6-223861 A | 8/1994 | |
| JP | 08-064199 | * 3/1996 | ............ H01M 2/34 |
| JP | 8-64199 A | 3/1996 | |
| JP | 08-115729 A | 5/1996 | |
| JP | 4061938 B2 | 3/2008 | |
| JP | 2009-26704 A | 2/2009 | |
| JP | 2009-48966 A | 3/2009 | |
| JP | 2009-170137 A | 7/2009 | |
| JP | 2009-277443 A | 11/2009 | |
| JP | 4359857 B1 | 11/2009 | |
| JP | 2010-287456 A | 12/2010 | |

OTHER PUBLICATIONS

Machine translation of JP 08-064199, retrieved from <http://www19.ipdl.inpit.go.jp/PA1/cgi-bin/PA1INDEX> on Oct. 3, 2014.*
Extended European Search Report dated Apr. 26, 2012.

* cited by examiner

*Primary Examiner* — Cynthia K Walls
(74) *Attorney, Agent, or Firm* — McGinn IP Law Group, PLLC

(57) ABSTRACT

There is provided an electric storage device in which an electrode assembly enclosed in an insulating cover can be smoothly inserted in a case and the electrode assembly is positioned in place inside the case when housed in the case. The electric storage device according to the present invention includes an electrode assembly, an insulating cover covering the electrode assembly, and a case including a case body having a rectangular box shape and having an opening, the case body being configured to house the electrode assembly and the insulating cover, wherein the insulating cover is formed into a rectangular box shape conforming to the case body, and a portion of each of edges at which adjacent side surfaces of the insulating cover meet each other is beveled into a beveled part, the portion being close to the bottom of the insulating cover.

17 Claims, 7 Drawing Sheets

F I G . 5
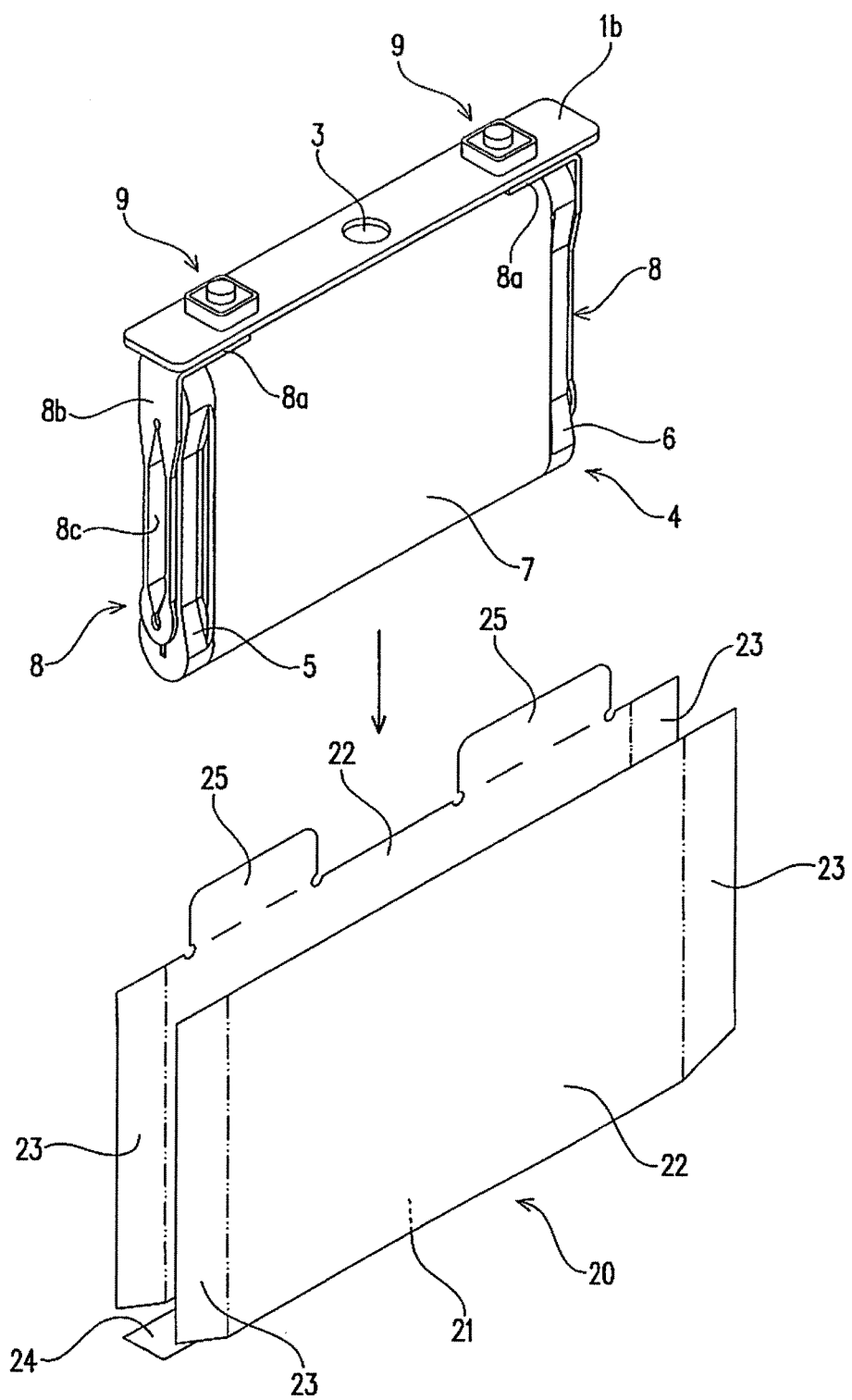

F I G . 6
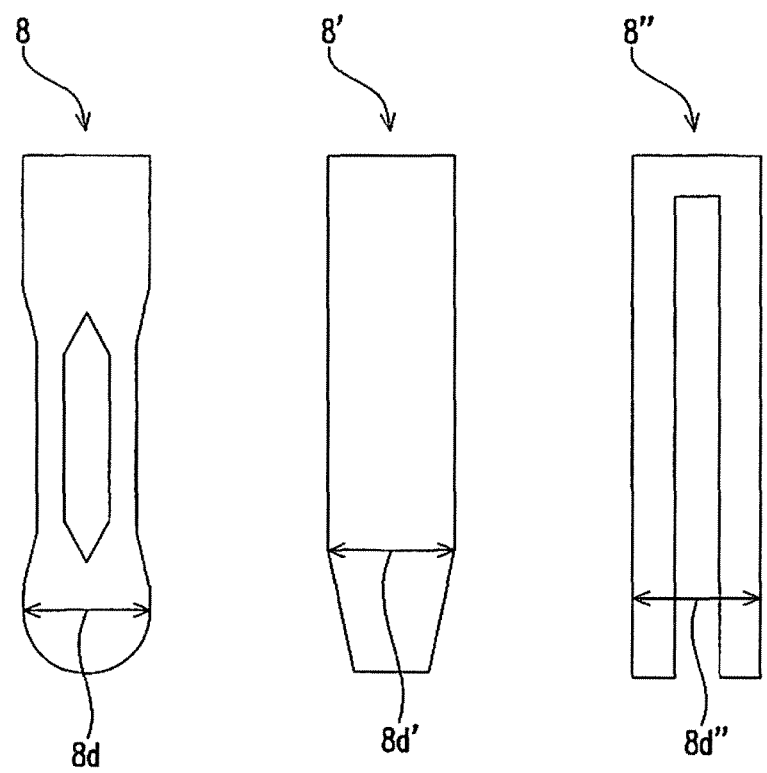

WIDTH DIRECTION

ELECTRIC STORAGE DEVICE

CROSS-REFERENCE TO RELATED APPLICATION

This application claims priority from Japanese Patent Application No. 2010-293134, the disclosure of which is incorporated herein by reference in its entirety.

FIELD OF THE INVENTION

The present invention relates to an electric storage device, wherein an electrode assembly to be housed in a case is covered with an insulating cover, which insulates the electrode assembly from the case.

BACKGROUND ART

In recent years, rechargeable and dischargeable electric storage devices such as battery cells (e.g., a lithium ion battery cell and a nickel-metal hydride battery cell) and capacitors (e.g., an electric double layer capacitor) have been adopted as the power sources of vehicles (e.g., an automobile and a motorcycle) and various devices (e.g., a portable terminal and a laptop computer). For example, various energy-dense lithium secondary battery cells are made available as a power source for electric vehicles or the like. A lithium secondary battery cell includes an electrode assembly housed in a metal case, electrode terminals projecting from inside the case to the outside of the case, a current collector which interconnects the electrode assembly and electrode terminals, and an insulating cover disposed between the case and the electrode assembly to insulate them.

Patent Document 1 (JP-A-2009-26704) describes a battery cell including an electrode assembly ("electrode element" in Patent Document 1) designed to be easily insertable into a case ("outer case" in Patent Document 1) and an insulating cover ("insulating film" in Patent Document 1). In the battery cell, the electrode assembly 120 is inserted in the insulating cover 110 having the shape of a bag with an opening 111, is then placed in an interior space 131 formed in the case 130 and is supported by the inner walls of the case 130 via the insulating cover 110 as illustrated in FIG. 7.

Projecting sides 112, 112 are formed at both sides of the insulating cover 110 by pressing both sides of the insulating cover 110 from two sides to integrate them together. Accordingly, the two projecting sides 112 of the insulating cover 110 come into contact with the inner walls of the case 130. This reduces friction resistance caused when the insulating cover 110 is inserted into the case 130.

In the battery cell described in Patent Document 1, spaces as wide as the widths of the projecting sides 112 are formed inside the case 130 by the provision of the projecting sides 112 of the insulating cover 110. Furthermore, the spaces are formed to be longer than the projecting sides 112 so that the lower edges of the projecting sides 112 do not hit the inner walls of the case 130 when the electrode assembly 120 housed in the insulating cover 110 is inserted into the case 130.

Accordingly, in the battery cell described in Patent Document 1 described above, the electrode assembly 120 is not positioned in place inside the case 130 simply by inserting the electrode assembly 120 into the case 130. Consequently, the electrode assembly 120 can tilt so that the front and rear surfaces are at an angle with respect to the front and rear surfaces of the case 130. In that case, the cover plate of the case 130 to which the electrode assembly 120 is attached through the current collector does not fit the opening of the case body of the case 130. Accordingly, attaching the cover plate to the opening of the case body of the case 130 becomes considerably troublesome. This problem can occur with a capacitor (such as an electric double layer capacitor) as well.

SUMMARY OF THE INVENTION

An object of the present invention is to provide an electric storage device designed so that an electrode assembly covered with an insulating cover can be smoothly inserted into a case and the electrode assembly is housed and positioned in place in the case.

An electric storage device according to the present invention includes:

an electrode assembly;

an insulating cover covering the electrode assembly; and a case comprising a case body having a rectangular box shape and having an opening, the case body being configured to house the electrode assembly and the insulating cover;

wherein the insulating cover is formed into a rectangular box shape conforming to the case body; and a portion of each of edges at which adjacent side surfaces of the insulating cover meet each other is beveled into a beveled part, the portion being close to the bottom of the insulating cover.

In an embodiment of the present invention, the electric storage device may be configured in such a manner that:

the insulating cover includes: a bottom surface part; and a pair of opposed principal surface parts and a pair of opposed edge surface parts, the principal surface parts and the edge surface parts rising from end edges of the bottom surface part; and the insulating cover is formed by folding an insulating sheet.

In this case, the insulating sheet may include:

a first section that forms the bottom surface part;

a pair of second sections, projecting from a pair of opposed end edges of the first section, the pair of second sections forming the pair of principal surface parts; and a pair of third sections forming the pair of edge surface parts, each of the third sections projecting from one of a pair of opposed side edges of at least one of the pair of second sections.

Furthermore, in this case, the insulating sheet may have a boundary between the second section and the third section, a portion of the boundary close to the first section having a fold that forms the beveled part.

Furthermore, in this case, the fold may be provided in plural, which are aligned parallel to each other along the boundary.

In another embodiment of the electric storage device according to the present invention, each of the pair of third sections may include a piece of the third section projecting from one of the pair of second sections and another piece of the third section projecting from the other of the pair of second sections; and the two pieces of the third section may overlap each other.

In this case, the overlapping two pieces of the third section may be joined together.

Furthermore, in this case, the overlapping two pieces of the third section may be joined together at a portion opposite from the first section.

In still another a embodiment of the present invention, the electric storage device may further include:

a first current collector connected to the electrode assembly, the first current collector together with the electrode assembly being covered with the insulating cover, wherein the insulating sheet further includes a first flap projecting from an end edge of at least one of the pair of second sections, the first flap to be inserted into a gap formed between the first current collector and the electrode assembly, the gap being at the opening of the case body.

In this case, the electric storage device may further include a second current collector, wherein:

the electrode assembly includes a positive electrode plate and a negative electrode plate which are insulated from each other;

the first current collector is connected to the positive electrode plate and the second current collector is connected to the negative electrode plate; and the first flap is disposed in at least one of a position corresponding to the first current collector and a position corresponding to the second current collector.

Furthermore, in this case, the flap may further include a second flap, the first flap may be disposed in a position corresponding to the first current collector and the second flap may be disposed in a position corresponding to the second current collector.

In yet another embodiment of the electric storage device according to the present invention, embossing may be applied to the sheet entirely or partially.

In another embodiment of the present invention, the electric storage device may further include:

first and second current collectors connected to the electrode assembly, the first and second current collectors together with the electrode assembly being covered with the insulating cover, wherein the electrode assembly includes a positive electrode plate and a negative electrode plate which are insulated from each other;

the first current collector is connected to the positive electrode plate and the second current collector is connected to the negative electrode plate; and each of the pair of edge surface parts of the insulating cover may be sandwiched between an inner surface of the case body and a corresponding one of the first and the second current collectors.

In still another embodiment of the present invention, the electric storage device may further include:

first and second current collectors connected to the electrode assembly, the first and second current collectors together with the electrode assembly being covered with the insulating cover, wherein the electrode assembly includes a positive electrode plate and a negative electrode plate which are insulated from each other;

the first current collector is connected to the positive electrode plate and the second current collector is connected to the negative electrode plate; and the two pieces of the third section of the insulating sheet overlap each other along the current collector.

In yet another embodiment of the present invention, the electric storage device may further include:

a current collector connected to the electrode assembly, the current collector together with the electrode assembly being covered with the insulating cover, wherein the beveled part is located closer to the bottom of the case body than a wide portion of the current collector.

In this case, the wide portion of the current collector may be provided in a location in a tip part of the current collector, the location being an intermediate location in the direction of the length of the current collector; and the tip part of the current collector may gradually narrow from the wide portion toward a tip.

In another embodiment of the present invention, the electric storage device may further include:

a current collector connected to the electrode assembly, the current collector together with the electrode assembly being covered with the insulating cover, wherein the case includes the case body and a cover plate closing and sealing the opening of the case body; and the current collector is fixed on an inner surface of the cover plate.

BRIEF DESCRIPTION OF THE DRAWINGS

FIG. 5 is an exploded perspective view of the battery cell;

FIG. 6 is front views of various forms of a current collector which is included in the battery cell.

DETAILED DESCRIPTION OF THE PREFERRED EMBODIMENTS

Figure 1:
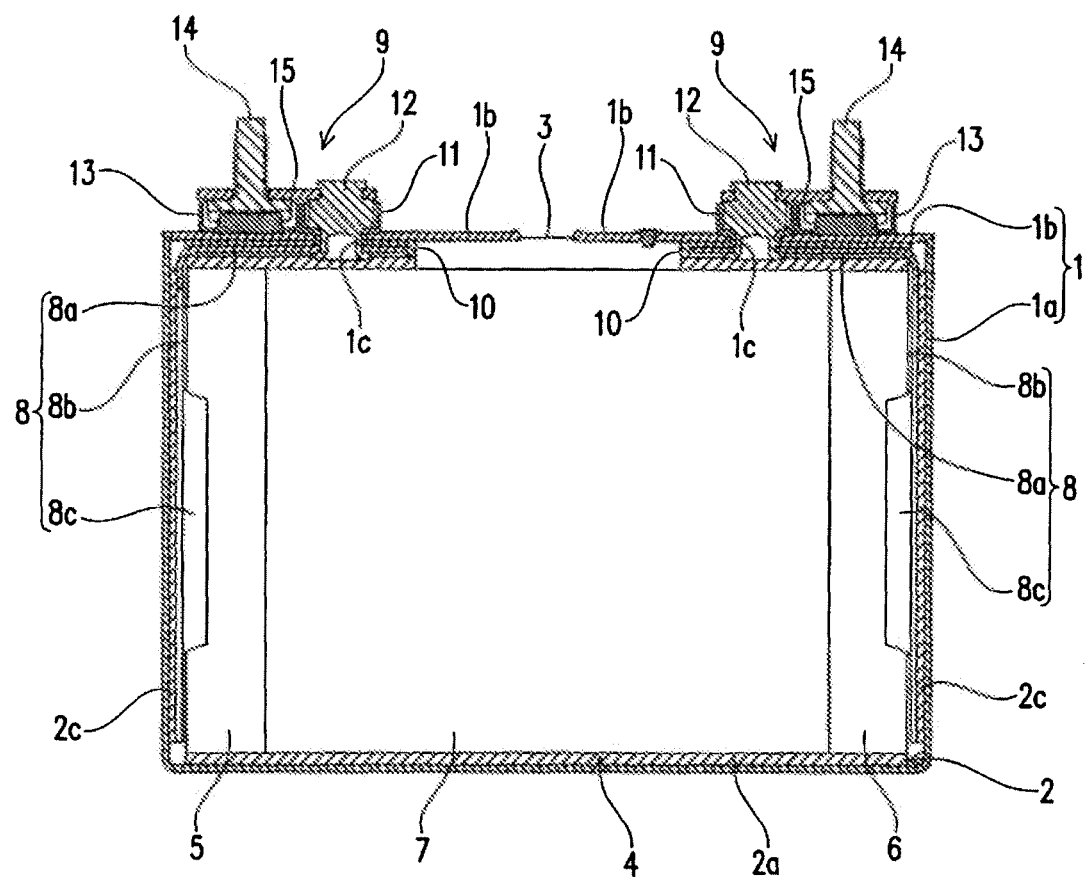
FIG. 1 is a cross-sectional front view of a battery cell according to the present invention.

A battery cell which is an embodiment of an electric storage device according to the present invention will be described below with reference to drawings. The battery cell according to this embodiment is a nonaqueous electrolyte secondary battery cell, more specifically, a lithium-ion secondary battery cell. As illustrated in FIG. 1, the battery cell according to this embodiment includes a case 1 made up of a case body 1*a* and a cover plate 1*b* which covers and seals an opening of the case body 1*a*. A terminal structure 9 which is electrically connected to an electrode assembly 4 housed in the case 1 are provided in the cover plate 1*b*.

The case body 1*a* and the cover plate 1*b* of the case 1 are made of a metal such as an aluminum alloy or steel. The case body 1*a* has the shape of a rectangular box that is flat in the width direction, designed to house the winding type electrode assembly 4 having the shape of an ellipsoidal cylinder. The cover plate 1*b* is a rectangular plate that fits the opening of the case body 1*a*. The cover plate 1*b* is fitted into the opening of the case body 1*a* and sealed and fixed by laser welding or other technique. A gas discharge vent 3 is provided in the center of the cover plate 1*b*.

In the electrode assembly 4, a band-shaped positive electrode plate 5 and a band-shaped negative electrode plate 6 which are displaced to each other in different lateral directions with a band-shaped separator 7 sandwiched therebetween are wound about a lateral rotation axis into a cylinder in the shape of a vertically long ellipse. The electrode assembly 4 is entirely covered with an insulating cover comprising an insulating sheet and is stored in the casing 1 while being insulated from the casing 1.

The positive electrode plate 5 includes aluminum foil carrying a positive electrode active material at the surface. The negative electrode plate 6 includes copper foil carrying a negative electrode active material at the surface. The positive electrode plate 5 and the negative electrode plate 6 each have a non-overlapped portion not coated with the active material at an edge in the lateral direction in which the sheet is displaced. With this arrangement, at the lateral ends of the electrode assembly 4, the aluminum foil and copper foil are exposed, and thus these metal foils of the positive electrode and negative electrode project from the overlapped portion in a wound configuration.

Metal foils projecting at the lateral ends of the electrode assembly 4 are electrically connected to respective current collectors 8. The current collectors 8 are a conductive metal member bent into a vertically long L-shape. More specifically, the current collector 8 for the positive electrode comprises aluminum or an aluminum alloy, and the current collector 8 for the negative electrode comprises copper or a copper alloy. The horizontal portion of the current collector 8 is a first connection part 8a. A gap is provided between the connection part 8a and the electrode assembly 4. The vertical portion of the current collector 8 is made up of an upper, intermediate part 8b and a lower, second connection part 8c which are continuous with each other.

The second connection part 8c is one that is two-forked and bent to a right angle in such a manner that the edges face the electrode assembly 4, or is one in which an opening is provided and two ridges are provided in such a manner that the edges face the electrode assembly 4. The second connection part 8c, together with an end of the electrode assembly 4, is clamped by a clamp plate, not shown, and is connected and fixed by ultrasonic welding or other technique.

The terminal structure 9 includes a positive electrode terminal structure 9 and a negative electrode terminal structure 9. Each terminal structure 9 includes a plastic plate 10, an outer gasket 11 internally and externally disposed to surround each of through-holes 1c formed at each of right and left ends of the cover plate 1b, a rivet 12 inserted into each through hole 1c through the plastic plate 10 and the outer gasket 11 and electrically connected to the connection part 8a of the current collector 8, a terminal retainer 13 disposed close to the outer gasket 11, a terminal bolt 14 disposed on the outer surface of the cover plate 1b through the terminal retainer 13, and a connection plate 15 which electrically interconnects the terminal bolt 14 and the rivet 12. This arrangement electrically connects the electrode assembly 4 in the case 1 to the terminal bolt 14.

The plastic plate 10, the outer gasket 11 and the terminal retainer 13 represent an insulating member. In particular, the outer gasket 11 (and the plastic plate 10 in some instances) also has a sealing function and therefore represents an insulating and sealing member. The rivet 12 represents an auxiliary terminal. The terminal bolt 14 represents an external terminal. The connection plate 15 represents connection conductor. However, the terminal retainer 13 may not have insulating properties. When aluminum or an aluminum alloy is used as a material for the case 1, the terminal retainer 13 of the positive electrode may be non-isolated so that the potential of the positive electrode may be identical with the potential of the case 1. This suppresses corrosion of the case 1. When iron or stainless steel is used as a material for the case 1, the terminal retainer 13 of the negative electrode may be non-isolated so that the potential of the negative electrode may be identical with the potential of the case 1.

The insulating cover 2 will now be described with reference to FIG. 2. The insulating cover 2 includes a rectangular bottom surface part 2a between the bottom plate of the case body 1a and the bottom of the electrode assembly 4, a pair of opposed principal surface parts 2b, 2b rising from end edges of the bottom surface part 2a, and a pair of edge surface parts 2c, 2c, and is formed into the shape of a rectangular box conforming to the shape of the case body 1a. A part of the boundary between each principal surface 2b and each edge surface part 2c of the insulating cover 2 that is near the bottom constitutes a beveled part 2d. The boundary between each principal surface 2b and each edge surface 2c except the beveled part 2d is a sharp edge (unbeveled part) 2e. For example, the beveled part 2d is 13% of the boundary between the principal surface 2b and the edge surface 2c and the sharp edge 2e is 87% of the boundary between the principal surface 2b and the edge surface 2c. The bottom surface part 2a constitutes the bottom of the insulating cover 2. The pair of principal surface parts 2b, 2b and the pair of the surfaces 2c, 2c constitute the side surfaces of the insulating cover 2.

Figure 3:
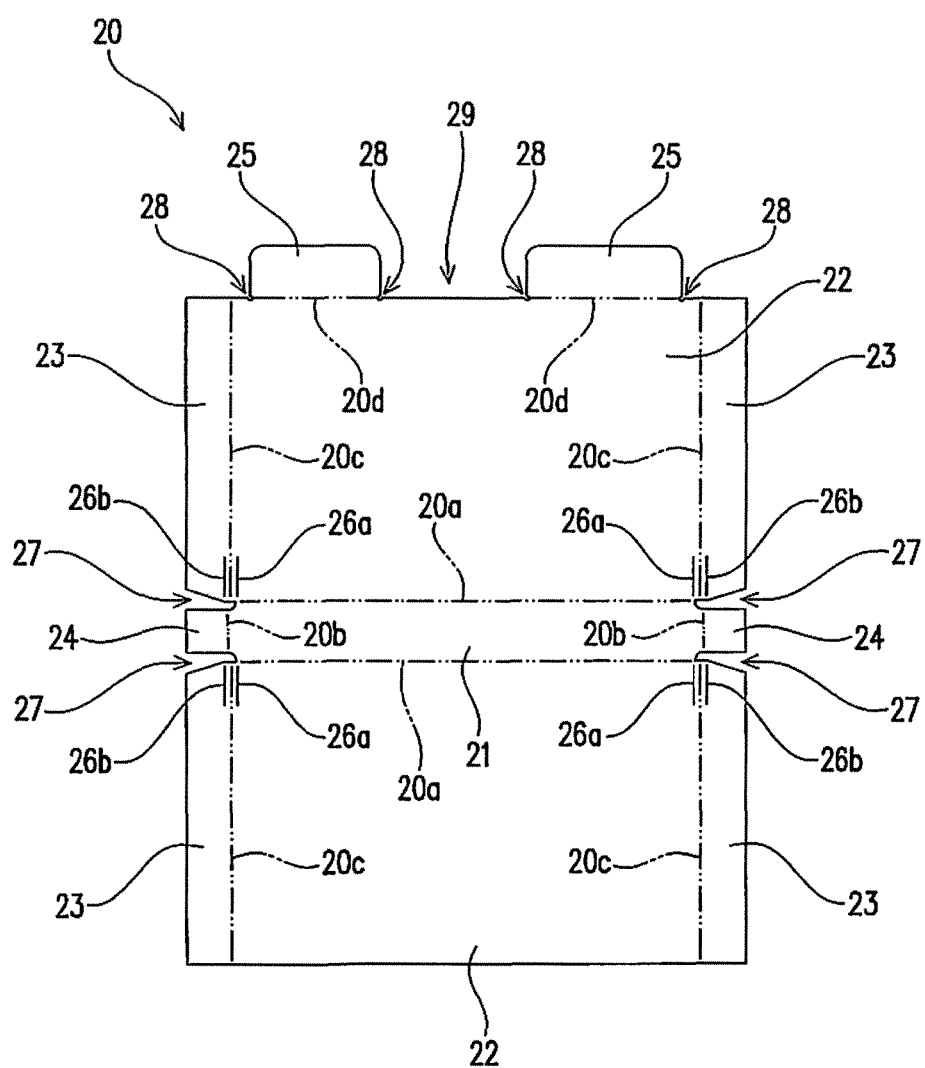
FIG. 3 is a plan view of a sheet to be made into an insulating cover which is included in the battery cell.

The insulating cover 2 is formed from a sheet 20 illustrated in FIG. 3. The sheet 20 includes a rectangular section (hereinafter referred to as the "first section") 21 that forms the bottom surface part 2a, sections (hereinafter referred to as the "second sections") 22, 22 that project from a pair of opposed end edges (boundaries) 20a, 20a at the longer sides of the first section 21 and form the principal surface parts 2b, 2b, projecting parts 24, 24 projecting from end edges (boundaries) 20b, 20b at the opposed pair of shorter sides of the first section 21, sections (hereinafter referred to as the "third sections") 23, 23 that project from the both side edges 20c, 20c of the second sections 22 and forms the edge surface parts 2c, 2c, and two flaps 25, 25, projecting from the outer edge 20d of one of the second sections 22, 22.

The first section 21 has the same size as the inner surface of the bottom plate of the case body 1a. Each of the third sections 23 has the same width as the inner surface of the edge plate of the case body 1a. The length of each of the projecting parts 24 projecting from the first section 21 is equal to the width of the third section 23.

The width of each of the flaps 25 projecting from the outer edge 20d of one of the second sections 22 is smaller than the width of the first section 21. It should be noted that the flaps 25 do not necessarily need to project from one of the second sections 22; although not depicted, one of the flaps 25 may project from one of the second section 22 and the other flap 25 may project from the other second section 22, provided that the two flaps 25 are paired correspondingly to the positive electrode and negative electrode terminal structures 9 and a blank part 29 is provided between the flaps 25.

Two folds 26a, 26b are formed on the first section 21 side of the boundary between the second section 22 and the third section 23 to provide the beveled part 2d. The folds 26a, 26b are formed along the boundary. The number of the folds is not limited to two. What is required is that a plurality of folds 26b, . . . are provided so that the beveled part 2d is formed. A notch 27 is formed from between the third section 23 and the projecting part 24 to the folds 26a formed in the second section 22. A tear-preventing cut 28 is formed at the boundary between the flap 25 and the second section 22 to prevent the sheet 20 from being torn.

Figure 4:
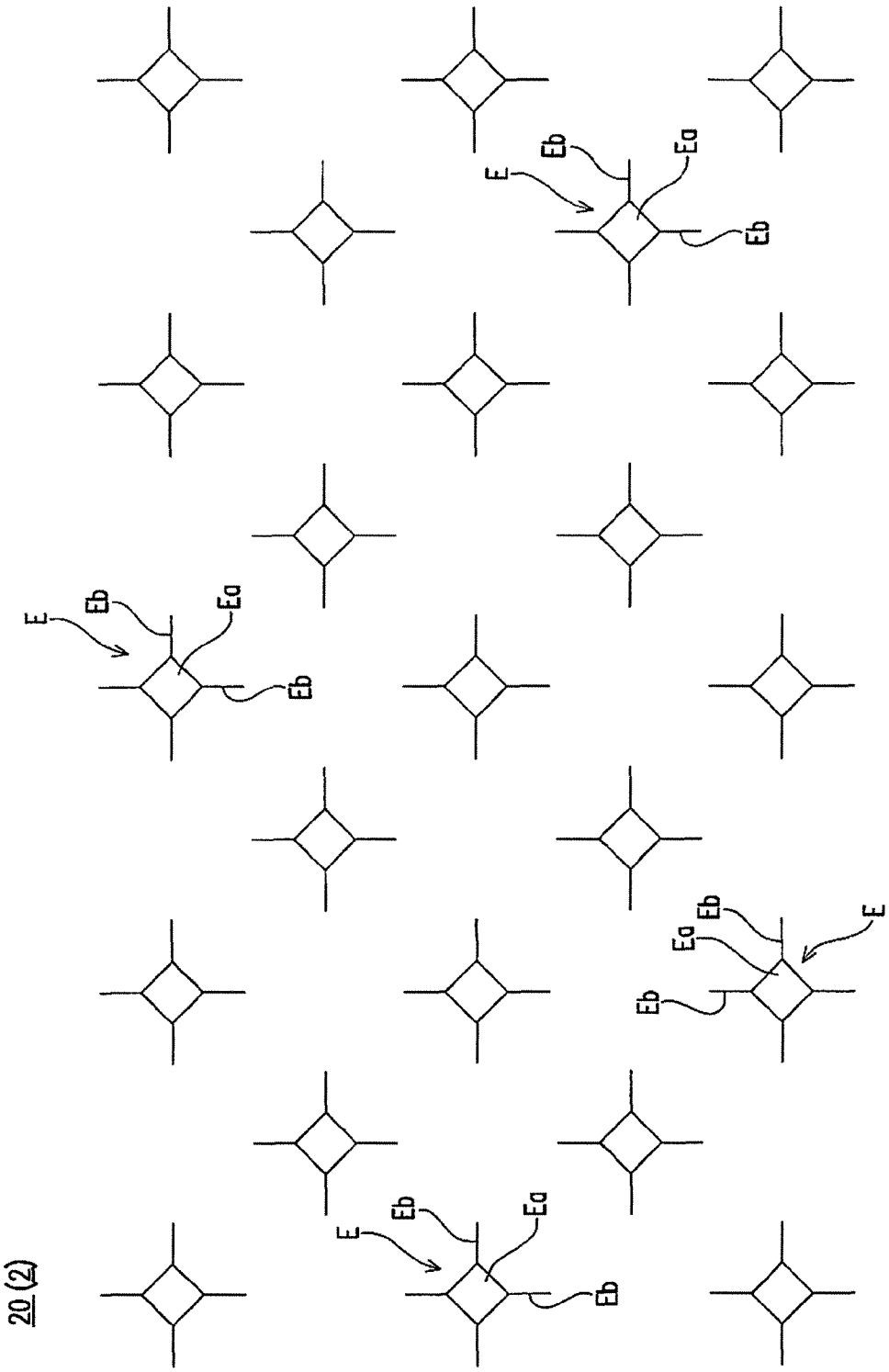
FIG. 4 is an enlarged view of embossing on the insulating cover.
Figure 7:
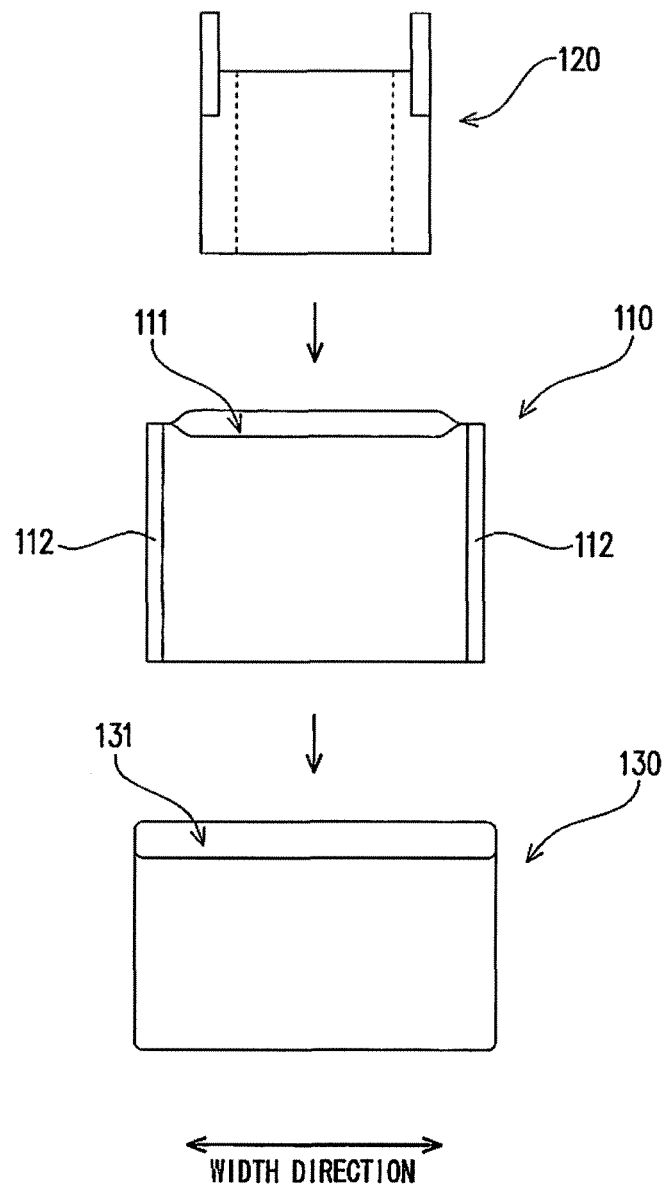
FIG. 7 is an exploded perspective view schematically illustrating a conventional battery cell.

As illustrated in FIG. 4, embossing E is applied to one or both of the surfaces of the sheet 20 entirely or partially. The embossing E is applied in such a manner that ridges Eb are extended from points of each protuberance Ea having the shape of a quadrangular frustum pyramid. Furthermore, the embossing E can be accomplished on both surfaces of the sheet 20 by depressing portions of the sheet 20 from one side and then depressing the regions adjacent to the portions from the other side.

It should be noted that when the unfolded sheets 20 are stacked and stored, the embossing E applied to one or both side of the sheets 20 prevents the stacked sheets 20 from sticking to each other. To prevent sticking, the embossing E needs to be applied to only one side of the sheet. However, preferably the embossing E is applied to both sides because the sheet 20 is likely to curl if only one side is embossed.

As illustrated in FIG. 5, the sheet 20 is folded along the boundaries 20a, 20a between the first section 21 and the second sections 22, 22 into a U-shape as seen from the side. The third section 23 projecting from one of the second sections 22 is folded along the side edge 20c and the third section 23 projecting from the other second section 22 is folded along the side edge 20c, then the third section 23 projecting from one of the second sections 22 and the third sections 23 projecting from the other second section 22 overlap each other. When the third sections 23 are folded, the third sections and the second sections 22 are also folded along the folds 26a, 26b to form the beveled parts 2d.

Figure 2:
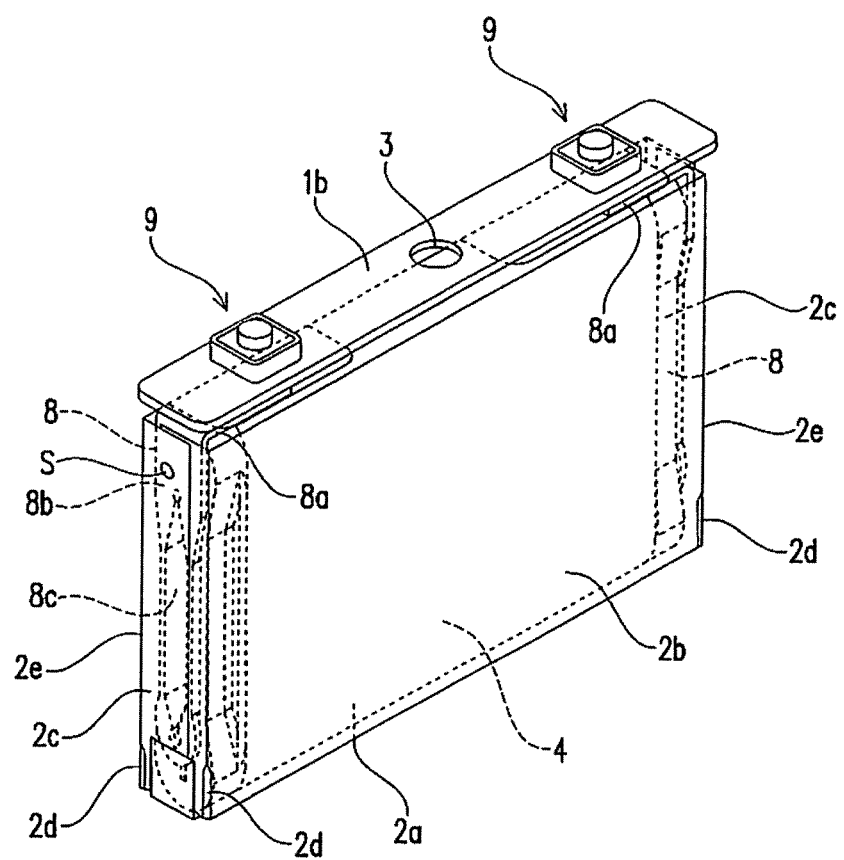
FIG. 2 is a perspective view of an essential portion of the battery cell.

Portions of the overlapping third sections 23, 23 close to the open end (the upper portions in FIG. 5), that is, portions of the overlapping third sections 23, 23 opposite from the beveled parts 2d, are sealed, for example heat-sealed by point sealing (cf., symbol S in FIG. 2). As a result, the sheet 20 is formed into the shape of a thin container and is prevented from unfolding. The electrode assembly 4 is inserted into the sheet 20 formed into the thin container. It should be noted that the entire length of the third sections 23 may be sealed.

Alternatively, the electrode assembly 4 may be placed in the sheet 20 when it is folded into a U-shape as seen from the side, so as to be sandwiched between the second sections 22, 22. Alternatively, the electrode assembly 4 may be placed on the first section 21 and then the second sections 22, 22 may be folded so that the electrode assembly 4 is sandwiched between the second sections 22, 22. In these cases, then the third sections 23, 23, . . . are folded so that the third section 23, 23 overlap each other along the vertical part of the current collector 8. Then, portions of the overlapping third sections 23, 23 on the open end side are sealed, for example heat-sealed together by point sealing while using the intermediate part 8b of the current collector 8 as a pad (cf., symbol S in FIG. 2). This prevents the sheet 20 from unfolding.

In any of the cases, the two flaps 25, 25 project from the second section 22 of the sheet 20 enclosing the electrode assembly 4. Each flap 25 is inserted in the gap between the connection part 8a of the current collector 8 and the electrode assembly 4. A blank part 29 is provided between the two flaps 25, 25 so that the gas discharge vent 3 is not covered by the flaps 25, 25. The projecting parts 24, 24 project from the first section 21.

The electrode assembly 4 covered with the sheet 20 in this manner is inserted into the case body 1a. As the electrode assembly 4 is inserted, the projecting parts 24, 24 are forcedly bent by the edges of the opening of the case body 1a to overlap the third sections 23, 23 and become part of the side surfaces 2c of the insulating cover 2. The provision of the beveled parts 2d near the bottom surface part 2a of the insulating cover 2 facilitates smooth insertion into the case body 1a. Thus, the electrode assembly 4 is smoothly inserted into the case body 1a.

Furthermore, the embossing E applied to the surface of the sheet of the insulating cover 2 reduces the contact friction between the inner walls of the case body 1a and the insulating cover 2. Accordingly, the electrode assembly 4 can be smoothly inserted into the case body 1a.

The edges 2e, . . . of the insulating cover 2 are in contact with (the edges of) the inner walls of the case body 1a when the electrode assembly 4 is fully housed in the case body 1a. The end surface parts 2c of the insulating cover 2 are sandwiched between the edge plates of the case body 1a and (the vertical parts of) the current collector 8 in tight or substantially tight contact. Accordingly, the electrode assembly 4 is positioned in place in the case body 1a when housed in the case body 1a. Consequently, the cover plate 1b can be easily joined to the opening of the case body 1a during manufacturing of the battery cell.

As has been described above, in the battery cell according to this embodiment, the beveled parts 2d, . . . are provided in the portions of the edges 2e, . . . between the adjacent side surfaces of the insulating cover 2 that are near the bottom of the insulating cover 2. This facilitates smooth insertion of the electrode assembly 4 into the case body 1a. Furthermore, when the electrode assembly 4 covered with the insulating cover 2 is housed in the case body 1a, the edges 2e, . . . of the insulating cover 2 at which the adjacent side surfaces meet each other are in contact with the inner surfaces of the case body 1a, except the beveled parts 2d, . . . . Accordingly, the electrode assembly 4 can be positioned in place in the case body 1a when housed in the case body 1a.

In the battery cell according to this embodiment, the insulating cover 2 is formed by folding the insulating sheet 20. This allows the electrode assembly 4 to be easily covered (enclosed).

In the battery cell according to this embodiment, the overlapping third sections 23, 23 are sealed together. This prevents the sheet 20 formed into a predetermined shape from unfolding. Because the sheet 20 does not unfold, the electrode assembly 4 covered with the sheet 20 can be easily inserted into the case body 1a.

Portions of the overlapping third sections 23, 23 close to the open end, that is, portions of the overlapping pieces of the third section 23, 23 opposite from the first sections 21, are sealed. Accordingly, the third section 23 projecting from one of the second sections 22 and the third section 23 projecting from the other second section 22 are out of line with each other in the direction of the width of the edge surface 2c when overlapping and being sealed, making the width of the edge surface parts 2c of the insulating cover 2 larger than the inside width of the case body 1a. Consequently, elastic resilience in the width direction is added to the insulating cover 2. This ensures the contact of the insulating cover 2 with the inner surfaces of the case body 1a.

Furthermore, in the battery cell according to this embodiment, the flaps 25 of the insulating cover 2 are inserted in the gap formed between the electrode assembly 4 and the first connection parts 8a of the current collector 8 (more specifically, the lower parts of the rivets 12 functioning as auxiliary terminals). Thus, the buffering effect of the flaps 25 can prevent damage and a short circuit of the electrode assembly 4 if the battery cell is so vigorously vibrated that the lower parts of the auxiliary terminals 12 and the electrode assembly 4 may hit against each other.

The vertical part of the current collector 8 has a wide portion 8d at the lower end (tip part) as illustrated in the left-hand part of FIG. 6. The lower end (tip part) of the current collector 8 gradually narrows from the wide portion 8d. Each of the beveled parts 2d of the insulating cover 2 is located nearer to the bottom of the case body 1a than the wide portion 8d. Accordingly, the wide portion 8d of the current collector 8 does not hit the inner surfaces of the beveled parts 2d of the insulating cover 2. Therefore, the electrode assembly 4 connected with the current collector 8 can be easily inserted into the insulating cover 2. This advantageous effect is also produced by the shape of a current collector 8' (wide portion 8d') illustrated in the middle part of FIG. 6 and the shape of a current collector 8'' (wide portion 8d'') illustrated in the right-hand part of FIG. 6.

The present invention is not limited to the embodiments described above; various modifications may be made without departing from the spirit of the present invention.

For example, the insulating cover 2 may be configured to be housed in the case body 1a without heat-sealing the overlapping third sections 23, 23. Furthermore, the third sections 23, 23 do not necessarily need to be sealed together. For example, the third sections 23, 23 may be adhered to each other. Moreover, the embossing E is not essential.

The insulating cover 2 does not necessarily need to be formed from a sheet 20 like the one illustrated in FIG. 3. Furthermore, if the gas discharge vent 3 is provided in a plate of the case body 1a rather than in the cover plate 1b, one elongated flap 25 may be provided rather than the two flaps 25.

The shape of the case body 1a does not necessarily need to be a flat rectangular box shape one side of which is longer than the other; the case body 1a may have the shape of a square box.

The electrode assembly is not limited to the winding type having the shape of an ellipsoidal cylinder described above; the electrode assembly may have any shape and may be of multilayered type.

While the embodiments have been described with respect to a lithium-ion battery cell, the present invention can be applied to battery cells of any type and size (capacity).

The present invention is not limited to lithium-ion secondary battery cells. The present invention can be applied to various secondary battery cells and primary battery cells, and capacitors such as electrical double layer capacitors.

The invention claimed is:

1. An electric storage device, comprising:
an electrode assembly;
an insulating cover covering the electrode assembly; and
a case comprising a case body having a rectangular box shape and including an opening, the case body being configured to house the electrode assembly and the insulating cover,
wherein the insulating cover is formed into a rectangular box shape confoHning to the case body,
wherein a portion of each of edges at which adjacent side surfaces of the insulating cover meet each other is beveled into a beveled part, the portion being close to a bottom of the insulating cover,
wherein the insulating cover comprises:
a bottom surface part; and
a pair of opposed principal surface parts and a pair of opposed edge surface parts, the principal surface parts and the edge surface parts rising from end edges of the bottom surface part,
wherein the insulating cover is formed by folding an insulating sheet, and
wherein the insulating sheet comprises:
a first section that forms the bottom surface part;
a pair of second sections, projecting from a pair of opposed end edges of the first section, the pair of second sections forming the pair of principal surface parts; and
a pair of third sections forming the pair of edge surface parts, each of the third sections projecting from one of a pair of opposed side edges of at least one of the pair of second sections.

2. The electric storage device according to claim 1, wherein the insulating sheet includes a boundary between the second section and the third section, a portion of the boundary close to the first section comprising a fold that forms the beveled part.

3. The electric storage device according to claim 2, wherein the fold is provided in plural, which are aligned parallel to each other along the boundary.

4. The electric storage device according to claim 1, wherein said each of the pair of third sections comprises a piece of the third section projecting from said one of the pair of second sections and another piece of the third section projecting from another of the pair of second sections, and
wherein the two pieces of the third section overlap each other.

5. The electric storage device according to claim 4, wherein the overlapping two pieces of the third section are joined together.

6. The electric storage device according to claim 5, wherein the overlapping two pieces of the third section are joined together at a portion opposite from the first section.

7. The electric storage device according to claim 1, further comprising:
a first current collector electrically connected to the electrode assembly, the first current collector together with the electrode assembly being covered with the insulating cover,
wherein the insulating sheet further comprises a first flap projecting from an end edge of at least said one of the pair of second sections, the first flap being inserted into a gap formed between the first current collector and the electrode assembly, and the gap being at the opening of the case body.

8. The electric storage device according to claim 7, further comprising a second current collector,
wherein the electrode assembly comprises a positive electrode plate and a negative electrode plate which are insulated from each other,
wherein the first current collector is connected to the positive electrode plate and the second current collector is connected to the negative electrode plate, and
wherein the first flap is disposed in at least one of a position corresponding to the first current collector and a position corresponding to the second current collector.

9. The electric storage device according to claim 7, wherein the insulating sheet further comprises a second flap, the first flap being disposed in a position corresponding to the first current collector and the second flap is disposed in a position corresponding to the second current collector.

10. The electric storage device according to claim 1, wherein embossing is applied to the insulating sheet entirely or partially.

11. The electric storage device according to claim 1, further comprising:
first and second current collectors electrically connected to the electrode assembly, the first and second current collectors together with the electrode assembly being covered with the insulating cover,
wherein the electrode assembly comprises a positive electrode plate and a negative electrode plate which are insulated from each other,
wherein the first current collector is connected to the positive electrode plate and the second current collector is connected to the negative electrode plate, and
wherein each of the pair of edge surface parts of the insulating cover is sandwiched between an inner surface of the case body and a corresponding one of the first and second current collectors.

12. The electric storage device according to claim 4, further comprising:
    first and second current collectors electrically connected to the electrode assembly, the first and second current collectors together with the electrode assembly being covered with the insulating cover,
    wherein the electrode assembly comprises a positive electrode plate and a negative electrode plate which are insulated from each other,
    wherein the first current collector is connected to the positive electrode plate and the second current collector is connected to the negative electrode plate, and
    wherein the two pieces of the third section of the insulating sheet overlap each other along the current collector.

13. The electric storage device according to claim 1, further comprising:
    a current collector electrically connected to the electrode assembly, the current collector together with the electrode assembly being covered with the insulating cover,
    wherein the beveled part is located closer to a bottom of the case body than a wide portion of the current collector.

14. The electric storage device according to claim 13, wherein the wide portion of the current collector is provided in a location in a tip part of the current collector, the location being an intermediate location in a direction of a length of the current collector, and
    wherein the tip part of the current collector gradually narrows from the wide portion toward a tip.

15. The electric storage device according to claim 1, further comprising:
    a current collector electrically connected to the electrode assembly, the current collector together with the electrode assembly being covered with the insulating cover,
    wherein the case comprises the case body and a cover plate closing and sealing the opening of the case body, and
    wherein the current collector is fixed on an inner surface of the cover plate.

16. An electric storage device, comprising:
    an electrode assembly;
    an insulating cover covering the electrode assembly; and
    a case comprising a case body having a rectangular box shape and including an opening, the case body being configured to house the electrode assembly and the insulating cover,
    wherein the insulating cover is formed into a rectangular box shape conforming to the case body,
    wherein a portion of each of edges at which adjacent side surfaces of the insulating cover meet each other is beveled into a beveled part, the portion being close to a bottom of the insulating cover, and
    wherein an embossing is applied to the insulating sheet.

17. An electric storage device, comprising:
    an electrode assembly;
    an insulating cover covering the electrode assembly;
    a case comprising a case body having a rectangular box shape and including an opening, the case body being configured to house the electrode assembly and the insulating cover,
        wherein the insulating cover is formed into a rectangular box shape conforming to the case body, and
        wherein a portion of each of edges at which adjacent side surfaces of the insulating cover meet each other is beveled into a beveled part, the portion being close to a bottom of the insulating cover; and
    a current collector electrically connected to the electrode assembly,
    wherein the beveled part is located closer to a bottom of the case body than a wide portion of the current collector, and
    wherein the wide portion of the current collector is provided in a location in a tip part of the current collector, the location defining an intermediate location in a direction of a length of the current collector.

\* \* \* \* \*